United States Patent [19]

Rieple et al.

[11] Patent Number: 5,042,840

[45] Date of Patent: Aug. 27, 1991

[54] REFILLABLE TANK CAR FOR STORING AND TRANSPORTING FLUIDS

[75] Inventors: Theodore R. Rieple, Farmington Hills; David J. Rumics, Northville, both of Mich.; Jack D. Moore, Woodleaf, N.C.; Waldon A. Strangberg, Kenosha, Wis.

[73] Assignee: Diversey Corporation, Mississauga, Canada

[21] Appl. No.: 470,143

[22] Filed: Jan. 25, 1990

Related U.S. Application Data

[63] Continuation-in-part of Ser. No. 340,515, Apr. 19, 1989, Pat. No. 4,986,292.

[51] Int. Cl.[5] .......................... B60P 3/22; B65B 3/04; F16L 29/00

[52] U.S. Cl. .................................... 280/830; 137/558; 137/572; 137/614; 137/899; 141/35; 141/94; 220/DIG. 4; 280/421; 280/832; 280/839

[58] Field of Search ............... 280/839, 830, 421, 832; 137/558, 899, 572, 614; 220/DIG. 24; 141/35, 36, 94

[56] References Cited

U.S. PATENT DOCUMENTS

| | | | |
|---|---|---|---|
| 1,542,116 | 6/1925 | Welcker | 137/572 |
| 2,189,945 | 2/1940 | Fitch | 280/832 |
| 2,237,310 | 4/1941 | Norbom | 280/832 |
| 2,259,319 | 10/1941 | Norbom | 280/832 |
| 2,471,280 | 5/1949 | Norbom | 137/899 |
| 2,533,640 | 12/1950 | Ulrich | 280/421 |
| 2,872,951 | 2/1959 | Wilkerson | 141/94 |
| 3,730,221 | 5/1973 | Vik | 137/614 |
| 4,266,580 | 5/1981 | Dixon | 137/572 |

*Primary Examiner*—Mitchell J. Hill

*Attorney, Agent, or Firm*—Weintraub, DuRoss & Brady

[57] ABSTRACT

The present invention includes a system for storing and transporting a liquid in which a series of tank cars each have a hollow tank body with an inlet and an outlet supported on a frame with a plurality of wheels on the frame. In one embodiment, these cars are connected together with a sealable male fitting and female fitting which interengage to allow fluid flow between the cars. Using this valve arrangement, a series of cars hooked together may be filled from a single fill point or station. A method of storing and transporting a liquid involving these storage cars is also disclosed.

7 Claims, 4 Drawing Sheets

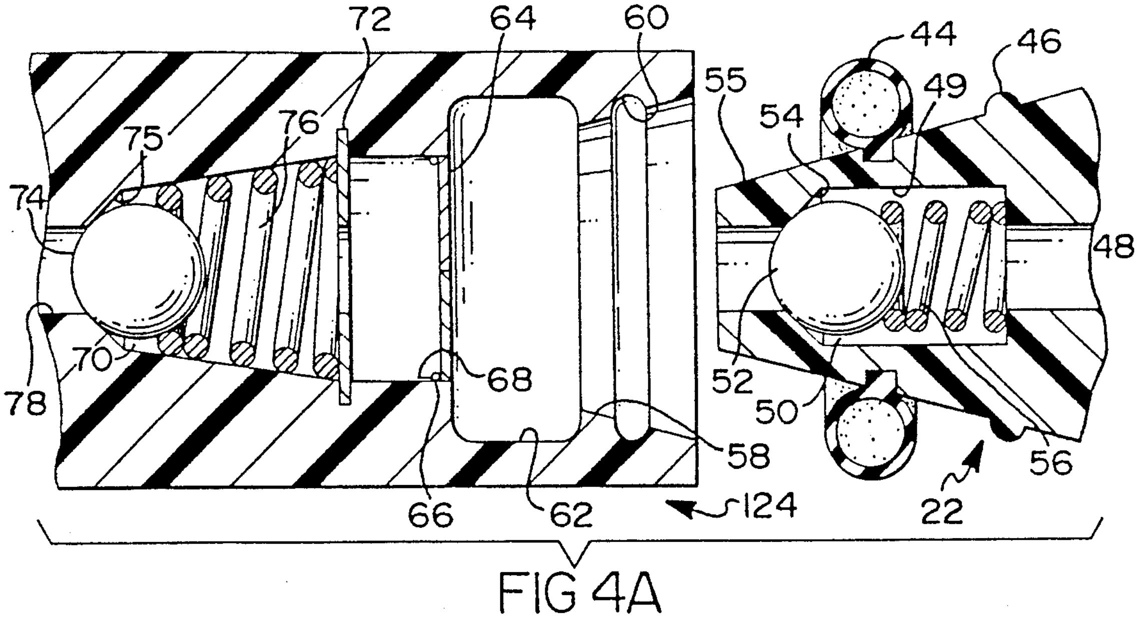
FIG 4A
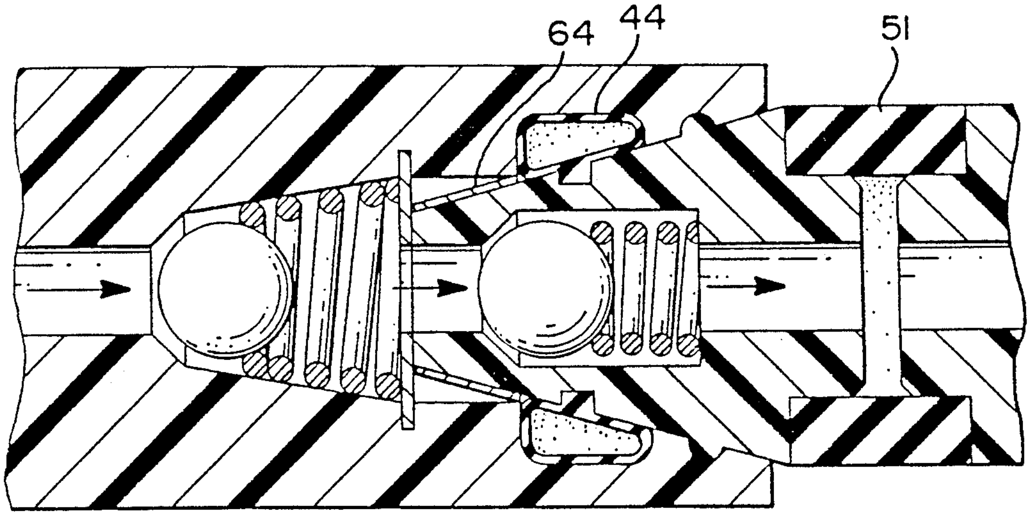
FIG 4B
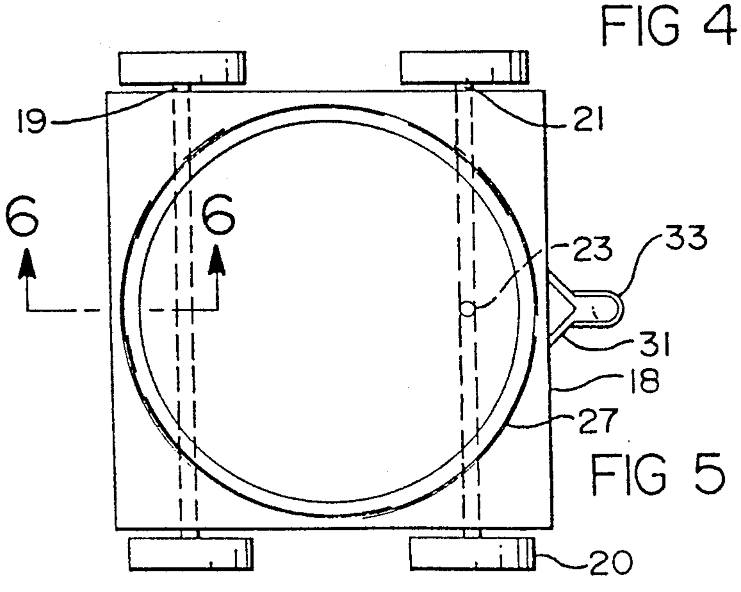
FIG 5
FIG 6
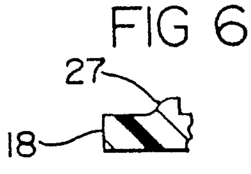

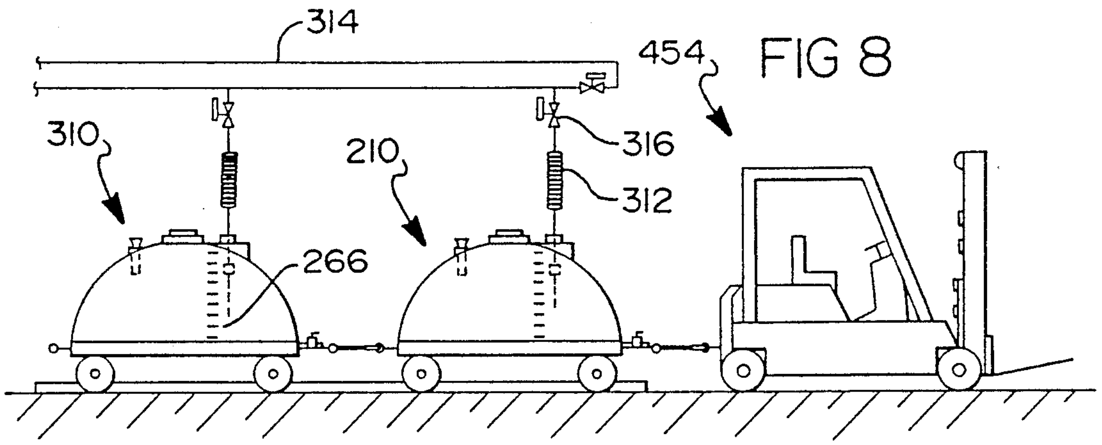
FIG 8
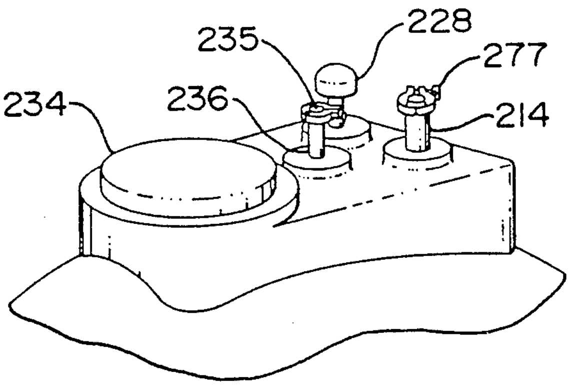
FIG 9
FIG 10
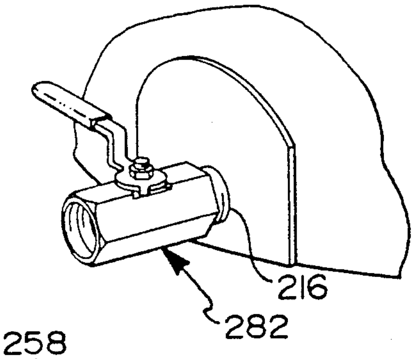
FIG 11
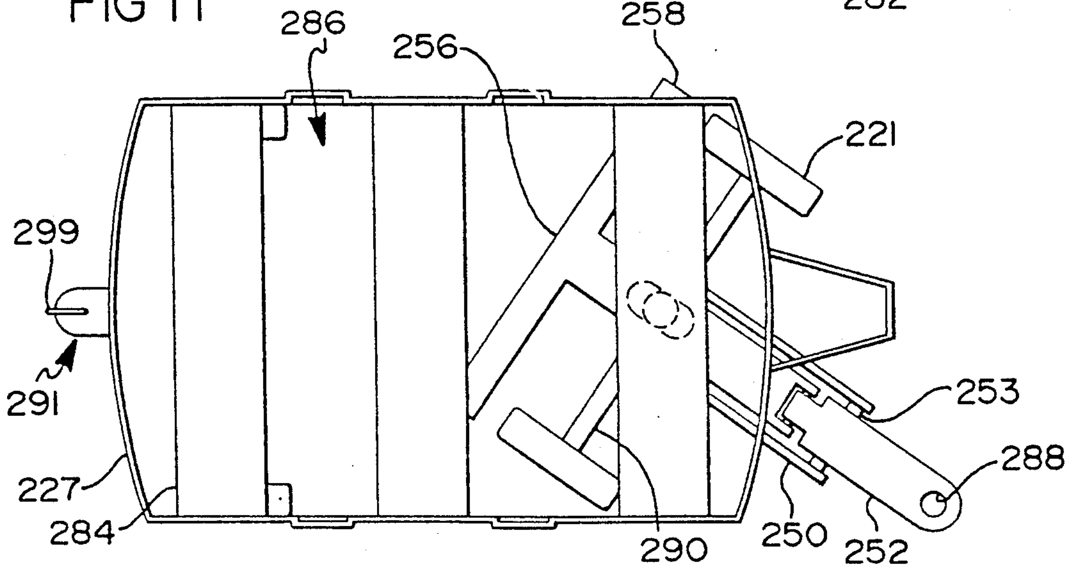

REFILLABLE TANK CAR FOR STORING AND TRANSPORTING FLUIDS

CROSS-REFERENCE TO RELATED APPLICATION

The present application is a continuation-in-part of U.S. Pat. application Ser. No. 07/340,515, filed Apr. 19, 1989, now U.S. Pat. No. 4,986,292 issued on Jan. 22, 1991, the disclosure of which is hereby incorporated by reference.

BACKGROUND OF THE INVENTION

1. Field of the Invention

The present invention relates to a system and method for bulk storage and transport of liquids in an industrial setting. More particularly, the present invention relates to such a system and method involving connectable and disconnectable storage cars which may be filled with a liquid and which may be easily transported by a forklift, tow motor, or the like to a point of use.

2. Prior Art

Bulk storage and transfer systems for use with liquids in industrial settings have several advantages such as cost savings, convenience, and ready accessibility. However, current in-plant bulk storage and transfer systems normally involve large tanks with limited or nonexistent mobility, and complicated and expensive piping systems to transfer the material stored in the tanks to points of use. Thus, flexibility of current systems is less than optimal.

Moreover, medium and smaller industrial companies are not always candidates for current bulk delivery systems due to their size. Yet, many such customers would like to take advantage of the safety, convenience, and cost savings that bulk delivery provides.

Portable reusable containers for liquids, such as those marketed by Hoover Universal as "TOTE BINS", are known and used today. However, these bins are expensive to return to a seller of the bulk liquid, and further costs are incurred to clean and to refill the currently used containers. In addition, these portable bins sometimes exceed the weight capacity of a forklift truck which is ordinarily used to move them about in a plant. Furthermore, the size of these portable bins is not standardized, and they must be weighed, to determine the volume contained therein, each time they are filled.

The use of 55-gallon drums is, also, common for the transport and storage of chemicals and the like. However, disposing of these drums once they are emptied of their contents is increasingly becoming a problem due to the current crisis in landfill space and the possibly hazardous nature of some contents of the drums. In view of this current crisis in land fill operations in the United States, particularly hazardous waste land fills and the like, it would be advantageous to minimize use of disposable 55-gallon drums.

Thus, it is to be appreciated that there exists a need for improved means and methods for the storage and transport of bulk chemicals and other fluids within an industrial plant or the like. It is to this need that the present invention is directed.

SUMMARY OF THE INVENTION

The present invention provides a system and method for bulk storage and transport of liquids, such as chemicals or the like, within an industrial plant or complex. The system hereof is defined by a series of standard sized refillable and reusable storage cars. These cars are connectable to one another in series. Any single car, in accordance with the present invention, whether full or empty, may be lifted by a standard forklift truck or otherwise easily transported to a point of use. Alternatively, one or more of these cars may be pulled behind a forklift truck.

A tank or storage car, in a preferred embodiment of the present invention, comprises:

(a) a support frame for supporting a tank body, the support frame having a side edge with access slots formed therein to accommodate insertion of a mechanical member thereinto for separating the tank body from the frame;

(b) a plurality of wheels rotatably mounted on the support frame to allow transport thereof; and (c) a hollow tank body for holding and storing fluid therein, the tank body having an inlet and an outlet and being mountable on the frame.

The car may further include means for locking the car in position, as well as means for interconnecting one car to another.

Also, the tank body preferably includes means for filling the body, means for emptying the body, means for purging or cleaning the interior of the body, and an electronic level sensor.

For a more complete understanding of the present invention, reference is made to the detailed description section, which should be read in conjunction with the accompanying drawings. Throughout the following description and in the drawings, identical reference numbers are used to refer to the same component shown in multiple figures of the drawings, in which:

BRIEF DESCRIPTION OF THE DRAWINGS

FIGS. 4A–4B are cross-sectional views of one embodiment of a male fitting engagable with a female fitting to serially connect two of the tank cars; wherein FIG. 4A shows the fittings disengaged, and FIG. 4B shows the fittings in an engaged configuration.

FIG. 5 is a top plan view of a tank car frame according to the first embodiment hereof;

FIG. 6 is a partial cross-section through the frame of FIG. 5, taken along the line 6—6;

FIG. 8 is a schematic diagram of a forklift truck connected to two tank cars in accordance with the second embodiment hereof;

FIG. 9 is a cut-away perspective view of the top section of the tank car of FIG. 7; and FIG. 10 is a cut-away perspective view of a flow valve at the front center portion of the tank car of FIG. 7.

DETAILED DESCRIPTION OF THE PREFERRED EMBODIMENT

Figures 1, 2, 3:
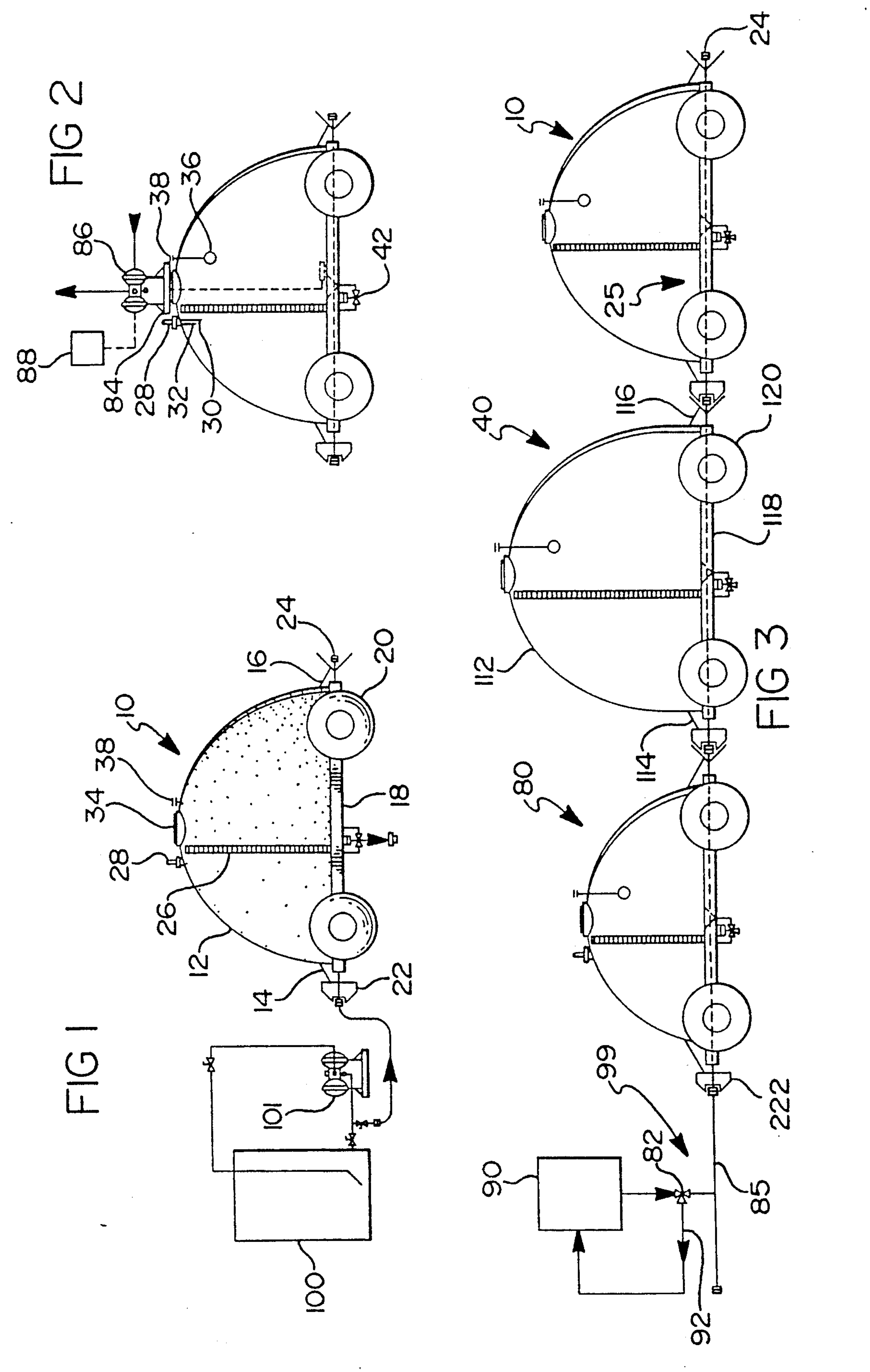
FIG. 1 is a side plan view, partially in schematic, of a first embodiment of a refillable tank car and pumping system for use in the present invention.
FIG. 2 is a schematic diagram of a modified version of the refillable tank car of FIG. 1 in accordance with the present invention.
FIG. 3 is a schematic diagram of a bulk storage and transport system including a series of three serially connected refillable tank cars in accordance with the first embodiment of present invention.

Referring to FIG. 1, and as disclosed in the copending application, a first embodiment of a refillable tank car 10 is shown as having a hollow tank body 12, the tank body 12 having an inlet 14 and an outlet 16. The tank body 12 is a generally hemispherical hollow member having a flat floor 25 which is continuous therewith. The tank body 12 serves as a container for storing fluids therein for extended periods of time without the contents thereof being exposed to the air outside of the tank body 12. In view of the possibility of storing corrosive materials therein such as acids or highly alkaline solutions, the tank body 12 is formed of a material which is resistant to erosion by such chemicals. Examples of suitable materials which may be used to form the tank body 12 include, e.g., molded fiberglass, impact-resistant plastics, and the like. The exact shape of the tank body 12 is not critical to the present invention. The tank car 10 is used for storing and transporting a liquid such as a chemical, a detergent, or other liquid primarily intended for use in industrial applications. However, it should be noted that the tank car may be used for transporting any liquid, slurry, suspension, or the like.

The tank body 12 is removably attached to a support frame 18 and a plurality of wheels 20 are rotatably attached to the frame 18. As seen in FIGS. 5–6, the frame 18 is a generally, rectangular, planar member formed from any suitable material, such as steel or the like, which has sufficient structural rigidity to support a filled tank body 12 thereon. A pair of spaced apart axles 19, 21 traverse the frame and are each used to support a pair of wheels 20 thereon. At least one of the axles 19, 21 is mounted to the frame 18 by a swivel or pivot 23 to enable the car 10 to turn. Alternatively, the wheels 20 may be mounted directly to the frame 18.

Each axle helps to support the frame 18. In the embodiment of FIG. 5, a circular ridge 27 is integrally formed with the frame 18, extends upwardly therefrom, and serves to align the tank body 12 with respect to the frame 18 and to retain the tank body 12 thereon.

As shown in the drawing, a male fitting 22 is attached to the front of the tank body 12 and is in fluid communication with the inlet 14 thereof. A female fitting 24 is located on the tank body 12 substantially opposite the male fitting 22. The male fitting 22 is sealably connectable to a female fitting 124 of a substantially similar car such as, e.g., a second tank car 40 shown in FIG. 3 to allow fluid flow therebetween, as subsequently detailed. The second tank car 40 includes a hollow tank body 112 having an inlet 114 and an outlet 116, the tank body 112 being mounted on a frame 118 having wheels 120, the second tank car 40 being substantially similar to the first tank car 10 in all respects except for capacity of the tank body 112.

In one embodiment, and as previously noted, the tank body 12 is formed as a unitary molded fiberglass or other impervious shell. When the tank body 12 is a fiberglass shell, this shell is fabricated to be resistant to corrosive chemicals such as, e.g., acid or alkaline. The capacity of the tank body 12 is preferably in a range from 100 gallons to 1,000 gallons. A particularly preferred capacity range is between 100 gallons and 300 gallons. The frame 18 and wheels 20 are also preferably formed of chemically resistant materials such as stainless steel, suitable polymers or elastomers, or graphite composite materials.

Two types of level sensors are incorporated into the tank car 10. A "sight glass" or visual level indicator 26 is, preferably, disposed vertically on the outside of the tank body 12 and is attached thereto. The indicator 26 is in fluid communication with the contents of the tank body 12 to enable visual inspection of the fluid level in the tank body 12. Secondly, an electronic full level sensor 28 as shown in FIG. 2 is disposed in the tank body 12, and preferably includes a low limit full level sensor 30 and a high limit full level sensor 32. The sensor 26 is in electronic communication with a vent in a cap on a hose fitting 38, the vent being both pressure operated and electrically operated. When a car such as 10 is being filled, the vent remains open until the sensor 26 indicates that the tank 12 is full. Then the vent is electronically closed.

A porthole or cover 34 is provided on the top of the tank body 12 and may be opened for inspection, access, and maintenance purposes. In the embodiment shown, a spray or shower head 36 is permanently disposed within the tank body 12 in fluid communication with a hose fitting 38 which is connectable to a fluid source (not shown) for use in cleaning the interior of the tank body 12. A drainage valve 42 is disposed at the bottom of the tank body 12 in fluid communication therewith. The drainage valve 42 may be used to meter out the contents of the tank body 12 and, also, may be used in conjunction with the spray head 36 for cleaning out the interior of the tank body 12. In a preferred embodiment of the present invention, a single tank car 10 is dimensioned and sized so as to be easily transportable, in either a full or empty condition, by a standard forklift truck.

For a high-volume industrial facility which has a bulk storage tank 100 on the premises, the tank car 10 may be used at a point where the contents thereof are needed, and then transported back to the storage tank 100 where a pump 101 may be used to refill the tank body 12 through the inlet 14. Once refilled, the tank car 10 is either pulled or carried by a forklift truck 454 back to the point of use.

In order to achieve the purposes of the present invention it is incumbent that the cars be serially connectable to allow transport, individually or simultaneously, of one or more cars. FIGS. 4A and 4B disclose one embodiment for enabling multiple filling of serially connected cars.

As shown in FIGS. 4A–4B, a male fitting 22 is shown with a female fitting 124 in both an engaged and disengaged position. The male fitting 22 is substantially conical in shape, and has a circumferential sealing ring 44 therearound. The sealing ring 44 is formed from a deformable resilient compound such as rubber or an elastomeric material, and is hollow and inflatable to form a tight seal between the male fitting 22 and a female fitting such as shown at 124 to prevent leakage therepast. An alignment ridge 46 is also provided around the male fitting 22 which is alignable with a circumferential groove 60 in the female fitting 124. As shown in FIG. 4B, the male fitting 22 may include a flexible rubber section 51. Alternatively, the male fitting 22 may be attached to the tank body 12 by pivot pins at the top and bottom thereof and by a flexible hose connecting a fluid passage 48 thereof to the inlet 14 of the tank body 12. This flexible attachment of the male fitting 22 to the tank body 12 works in conjunction with the flexible attachments of the male fittings of other cars in a series or "train" of these cars to allow the train to turn corners when being pulled by a fork truck 454 or the like.

A hollow fluid passage 48 is formed within the male fitting 22 to allow fluid communication with the hollow interior of the tank body 12 through the inlet 14 thereof. Disposed within an enlarged portion 49 of the passage 48 is a check ball 52 which is seated in a seat 54 by a spring 56, the spring 56 also being disposed within the enlarged portion 49 of the passage 48. The check ball 52, seat 54, and spring 56 thus provide a one way check valve 50 within the male fitting 22.

The female fitting 24 may be formed in the tank body 12 or may be attached thereto, and generally includes a substantially conical recess 58 formed therein. An enlarged toroidal groove 62 extends radially outwardly as part of the recess 58 and receives the sealing ring 44 therein as shown in FIG. 4B. A plurality of fluid-impervious doors or flaps 64 are disposed within the recess 58 forwardly of the toroidal groove 62. The doors 64 are attached to the female fitting 124 by hinges 66, and are biased toward a closed position as shown in FIG. 4A by springs 68. A check valve 70, is also, provided in the female fitting 124 to assure one way flow therethrough. The check valve 70 includes a check ball 74 which is disposed in a seat 75 and is biased into the seat 75 by a spring 76 disposed within the recess 58. A retaining ring 72 is provided to retain the spring 76 in the recess 58. A passage 78 continues forwardly of the recess 58 to allow fluid communication between the female fitting 124 and the interior of the tank body 112. The inlet 14 and outlet 16 generally are in fluid communication with the interior of the tank body 10. A pressure-actuated vent valve may be provided in the cover 34 or proximate the top of the tank body 12 to allow pressure in the tank body 12 to be relieved to the atmosphere if it exceeds a specified level. Such a vent valve may be incorporated into a cap on the hose fitting 38 for the spray head 36.

When the male fitting 22 is inserted into a female fitting 124 of a second car such as that shown at 40 in FIG. 3, the front portion 55 of the male fitting 22 pushes against the force of the springs 68 to open the doors 64 of the female fitting 24. The sealing ring 44 is then pressurized, such as with compressed air from a compressed air source (not shown), to retain the male fitting 22 in the female fitting 24 and to form a pressure-tight seal therebetween. A number of tank cars in accordance with the present invention such as 10, 40, and 80 as shown in FIG. 3 may be connected together in a series; and a single fluid source, such as a commercial tank truck symbolized by the box 90 in FIG. 3 may be used to fill the cars 10, 40, 80 simultaneously. The cars 10, 40, 80 may all be filled in this way at a single point or fill station such as that shown at 99 in FIG. 3. When the cars are hooked together as described, a fluid supply line 85 from a fluid source 90 is attached to the male fitting 222 of the forwardmost car 80 and a flow control valve 82 is then opened. Fluid pressure from the fluid source 90 will successively disengage check valves similar to those shown at 70, 50 in each of the male and female fittings of the cars 10, 40, 80 until the fluid pressure pushes against the fluid-impervious doors 64 of the last car 10 in the sequence. The doors 64 are designed to withstand high pressure without allowing the passage of fluid therepast. Thus the series of cars may be filled without spillage out of the female fitting 24 of the last car 10 in the sequence. Of course, because the doors 64 are normally sealed, any one individual car may be filled without fluid spillage.

Referring now to FIG. 2, a shelf unit 84 for attachment thereto of optional hardware may be mounted to the tank body 12 adjacent the porthole 34, and a suitable pump 86 and control panel 88 may be mounted to the shelf unit 84. One skilled in the art will realize that other optional features may be added to the tank car 10 without departing from the scope of the present invention.

A removable yoke 31 may in one embodiment, be provided for attachment to the tank car frame 18 for use in transporting a train of serially connected tank cars. The front of such a yoke may include a socket section 33 of a conventional trailer hitch. The yoke may be attached to the frame 18 by pins, nuts and bolts, or other appropriate fasteners.

The tank cars of the present invention may be manufactured in various capacities, and cars of different capacities may be joined together in series as shown in FIG. 3. The fill system described herein allows for cars of different sizes and capacities to be filled from one fill source 90 at the same time. The fill interlock system on each car is the same and is located at a standard height from the ground on all cars. The fill interlock system of the male and female fittings as herein described easily connects together, regardless of the size or capacity of the cars which are being connected together. Each car fills to its designated capacity and shuts off automatically as the check valve as shown at 70 opens and the other cars continue to fill. It would be within the scope of the present invention for five 250 gallon cars, one 100 gallon car, and two 500 gallon cars to be joined together in a train and to be filled at the same time.

The present invention also encompasses a system of bulk storage and transport of liquids, which includes a fluid return loop in communication with the fill valve 82 of the present invention, whereby when the pressure in the line 85 reaches a certain level because all the cars 10, 40 80 are filled, fluid from the fluid source 90 will no longer enter the system of the cars, but will be diverted back to the fluid source 90. A system for storing and transporting a liquid in accordance with the present invention is generally illustrated in FIG. 3.

The system of the present invention also includes a fill station 99, comprising a fill valve 82 for directing a flow of a liquid;

an overflow line 92 in fluid communication with the fill valve 82, the overflow line 92 connectable to a liquid source 90; and means for connecting the fill valve 82 to an inlet of a tank car. The means for connecting the fill valve 82 to an inlet of a tank car may be a fluid line 85 and connector as shown in FIG. 3.

It should be noted that another possible means for connecting the first tank body 12 to the second tank body 112 to allow fluid flow therebetween could be a conventional high-pressure hose and quick-disconnect compression fitting arrangement as will be appreciated by those skilled in the art. In this embodiment, a simple mechanical linkage such as that used to connect commercial railroad cars could be provided between the cars 10, 40.

Referring now to FIGS. 7–11, a second embodiment of a tank car 210 in accordance with the present invention is shown, the tank car 210 including a hollow tank body 212, which rests upon a support frame 218. The tank body 212 has an overhead inlet 214 and an outlet 216 at the front end thereof, and is a generally hollow member for storing and transporting fluids. The tank body 212 may, optionally, have a reinforcing ridge 215 around a lower edge thereof, as shown in FIG. 7B, for promoting durability and longevity thereof. The reinforcing ridge 215 may be formed of steel or other material having high structural strength, and the tank body 212 may be formed of plastic, fiberglass, or other chemically resistant materials.

In this second embodiment there is no fluid flow communication between the tank cars in a series, although a plurality of tank cars may be mechanically linked together and pulled by a forklife 454 as shown in FIG. 8.

The tank car 210 also includes a support frame 218 for supporting the tank body 212. The support frame 218, generally, comprises a primary support section 229 for surrounding and supporting the base of the tank car 212, and a yoke section 231 for allowing towing of the car 210 and also turning of the car 210. The yoke section 231 is pivotally attached to the primary support section 229 for pivotal motion with respect thereto.

The primary support section 229 is a generally rectangular frame having a vertical side edge 227 therearound and a series of flat bars 284 which traverse the side edge 227, and which are fixedly attached thereto. The side edge 227 and cross bars 284 define a seat 286 therewithin for receiving the tank body 212. Of course, the bars 284 could be a solid flooring surface. The primary support section 229 is formed of steel or another suitable material capable of holding and supporting the weight of a full tank body 212 thereon. The side edge 227 of the primary support section 229 has at least two access slots 240, 242 formed therein to accommodate insertion thereinto of a mechanical member, such as, e.g., the tines of a forklift truck 454, to allow lifting and separating of the tank body 212 from the frame 218. this allows for great flexibility with the use of the tank car 210 of the present invention, because the tank body 212 can be easily separated from the frame 218 and placed in a storage location or in a use location without the necessity of the tank body 212 remaining on the frame 218 for a prolonged period of time. This also makes it possible to use a single support frame 218 with plural tank bodies 212.

A plurality of wheels 220, 221 are rotatably attached to the frame 218 to allow transport of the tank car 210. The wheels 220 may include tires 244 as shown in FIG. 7. The tires 244 may be solid rubber, or alternatively, may be the inflatable pneumatic type or may be formed of other materials, as previously noted.

The yoke section 231 of the frame 218 is attached to the primary support section 222 by a pivot arm 245, of conventional construction and which includes a bearing (not shown). A front axle 290 is attached to the pivot arm 245 for mounting the front wheels thereonto. The yoke section 231 further includes a pair of lateral support arms 250, which extend forwardly from the front axle 290 and are fixedly attached thereto. A tow bar 252 is pivotally attached to both of the lateral support arms 250 by a first pivot pin 253. The tow bar 252 comprises means for attachment to a structure other than the tank car 210 such as, another tank car 310 or a forklift truck 454. The attaching means on the tow bar 252 may be a hole 288 formed therethrough, as in the depicted embodiment, or may be a conventional trailer-hitch arrangement. The tow bar 252 continues rearwardly beyond the first pivot pin 253, and is pivotally attached, at the back end thereof, to a generally "T"-shaped braking brace 256 by a second pivot pin 254. The braking brace 256 has two side flanges 258 which extend normally thereon and which are disposed just behind the front wheels 221 of the yoke section 231. The braking brace 256 may be supported above the axle 290, or, may pass therebelow and be held for slidable movement thereof by a suitable support bracket (not shown). The tow bar 252 can only be raised to an upright position when the yoke section 231 is not pointed straight ahead, but rather is turned to either side to clear the front of the primary support section 229. When the tow bar 252 is raised to a fully upright position, as shown in phantom in FIG. 7A, the pivoting of the tow bar 252 around the first pivot pin 253 moves the braking brace 256 forwardly because of its pivotal attachment to the end of the tow bar 252. This forward motion brings the two side flanges 258 of the braking brace 256 into frictional contact with the tires 244 of the front wheels 221, thus preventing them from turning and preventing the tank car 210 from moving. The yoke section 231 also includes means for locking the tow bar 252 in a fully upright position, such as a disengagable latch (not shown). When the tow bar 252 is locked in a fully upright position, the braking brace 256 prevents the wheels 220 from turning and thus prevents lateral motion of the tank car 210.

A hose fitting 238 having a vent 235 incorporated thereinto is provided in the top of the tank body 212 as shown in FIG. 9. The vent 235 may be manually or electronically operated, and if electrically operated, may be activated by a pressure sensor 281 within the tank body 212. The hose fitting 238 communicates with a spray head 236 within the tank body 212 for use in cleaning the interior thereof. A removable cover 234 is provided at the top of the tank body 212 to allow access to the interior of the tank body 212 for cleaning and the like. The tank body 212 in this embodiment also includes an electronic fluid sensor 228 for substantially identical to the level sensor 28 herein described for the first embodiment. Conventional high pressure or "clip" clamps 277 are used to close the inlet pipe 214 and outlet pipe 216 in the top of the tank body 212. A variable valve 282 is, optionally, provided on the front of the tank body to regulate fluid flow out of the outlet 216 of the tank body 212.

The tank body 212 may, optionally, be formed from a partially translucent material to allow visual inspection of the contents thereof, and may have indicia such as volume lines 266 thereon to allow measurement of fluid therein.

Figure 7A:
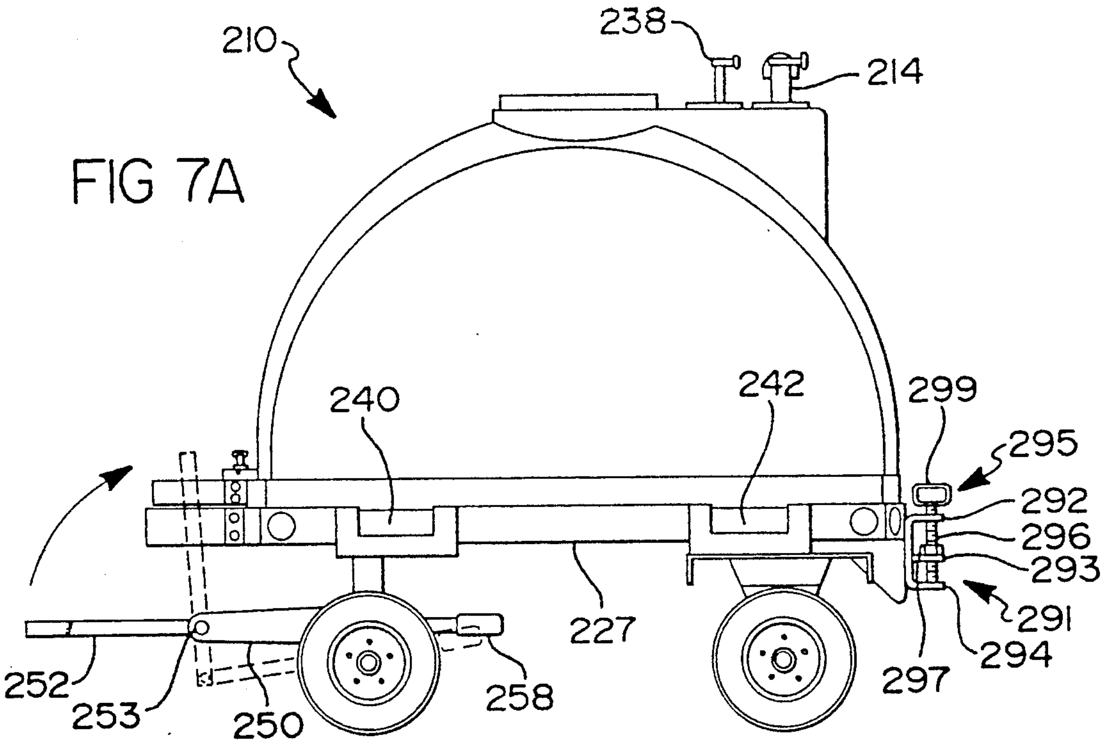
FIG. 7A–7B are side elevational views of a tank car according to a second embodiment of the present invention, FIG. 7A showing the tank body assembled to the frame and FIG. 7B being an exploded view showing the tank body removed from the frame.
Figure 7B:
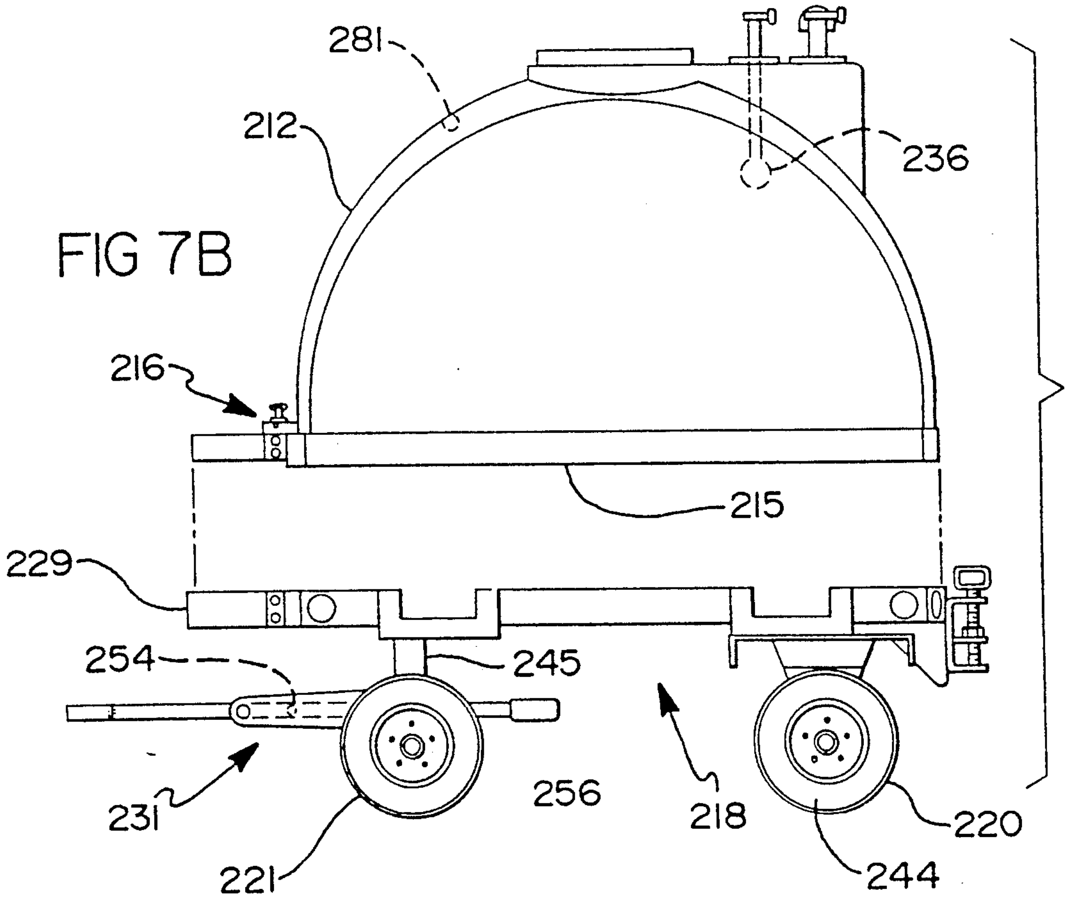

As seen in FIG. 7A, the back end of the frame 218 may have a hitch 291 thereon, comprising an upper plate 291, a middle plate 292, and a lower plate 293 each of which is generally flat and parallel to the ground. These plates are formed of a m aterial having high structural strength, such as, e.g. steel or another strong material, and are welded or otherwise firmly attached to the frame 218. In the depicted embodiment, the upper and lower plates 292, 294 are formed from a single piece of metal which is bent out at the ends, and the middle plate 293 is attached in the center thereof. Access holes (not shown) are formed through the upper and middle plates 292, 293 for passage therethrough of a latching rod 295, which is a cylindrical rod with a rectangular loop affixed to the top thereof which defines a handle 299. A coil spring 296 is disposed around the latching rod 295 between the upper plate 292 and the middle plate 293, and a collar 297 is fixedly attached to the rod 295 above the middle plate 293 and below the spring 296. The collar 297 is too large to fit through the hole in the middle plate 293, and the spring and collar together provide a means for uring the rod 295 downwardly against the lower plate 294. In order to hook two tank cars together according to the present invention, the latching lever 295 of a first car is grasped and pulled upwardly by an operator against the force of the spring, to move the rod thereof away from the lower plate 294. A tow bar 252 of a second car, such as that shown at 310, is then inserted between the middle and lower plates 293, 294 and the latching rod is then inserted through the hole 288 in the tow bar 252, where the spring 296 retains the latching rod 295 in place.

Although the present invention has been described herein with respect to specific embodiments, it will be understood that the foregoing description is intended to be illustrative and not restrictive. Many modifications of the present invention will occur to those skilled in the art. All such modifications which fall within the scope of the appended claims are intended to be within the scope and spirit of the present invention.

Referring now to FIG. 8, it may be seen that the tank cars 210, 310 in the second embodiment hereof are filled through the inlet pipe 214 with a fill hose 312 which is in fluid communication with an overhead supply line 314. A valve 316 in the fill hose 312 controls the rate of fluid flow therethrough.

Having, thus, described the invention, what is claimed is:

1. A tank car for storing and transporting fluid, comprising:

(a) a support frame for supporting a tank body, the support frame having a side edge with side access slots formed therein to accommodate insertion of a mechanical member thereinto for separating the tank body from the frame, the side edge of the support frame having a top surface and said side access slots extending below the top surface of the side edge;

(b) a plurality of wheels rotatably mounted on the support frame to allow transport thereof; and (c) a hollow tank body for holding and storing fluid therein, the tank body having an inlet and an outlet and being mountable on the frame;

wherein said side access slots of the support frame extend below the tank body when the tank body is mounted on the frame to define substantially empty access spaces between the frame and the tank body for receiving a mechanical member therein.

2. The tank car of claim 1, wherein the tank car further comprises an electronic fluid level sensor.

3. The tank car of claim 1, further comprising a variable valve on the tank body for controlling fluid flow out of the outlet.

4. The tank car of claim 1, wherein the tank body has indicia thereon to allow measurement of fluid therein.

5. The tank car of claim 1, wherein the inlet is disposed at the top of the tank car to allow top filling thereof.

6. A tank car for storing and transporting fluid, comprising:

(a) a support frame for supporting a tank body, the support frame having a side edge with access slots formed therein to accommodate insertion of a mechanical member thereinto for separating the tank body from the frame;

(b) a plurality of wheels rotatably mounted on the support frame to allow transport thereof; and (c) a hollow tank body for holding and storing fluid therein, the tank body having an inlet and an outlet and being mountable on the frame;

wherein the frame comprises a primary support section and a yoke section pivotally attached to the support section, the yoke section comprising:

means for attaching the frame to a vehicle to allow towing of the tank car; and means for temporarily and disengagably preventing the wheels from rotating.

7. The tank car of claim 6, wherein the means for preventing the wheels from rotating comprises a substantially T-shaped braking brace having side flanges which are disposed behind a pair of the wheels, and means for moving the side flanges into frictional contact with the wheels.

* * * * *